(12) United States Patent
Kandogan et al.

(10) Patent No.: US 6,184,867 B1
(45) Date of Patent: Feb. 6, 2001

(54) INPUT FOR THREE DIMENSIONAL NAVIGATION USING TWO JOYSTICKS

(75) Inventors: Eser Kandogan, Beltsville, MD (US); Barton A. Smith, Campbell; Shumin Zhai, San Jose, both of CA (US)

(73) Assignee: International Business Machines Corporation, Armonk, NY (US)

(*) Notice: Under 35 U.S.C. 154(b), the term of this patent shall be extended for 0 days.

(21) Appl. No.: 08/979,712

(22) Filed: Nov. 30, 1997

(51) Int. Cl.[7] ................................ G09G 5/00; G09G 5/08
(52) U.S. Cl. ...................... 345/161; 345/156; 345/157
(58) Field of Search .................................. 345/121, 161, 345/156, 429, 430, 157, 158, 167

(56) References Cited

U.S. PATENT DOCUMENTS

| | | | |
|---|---|---|---|
| 5,107,080 | * 4/1992 | Rosen | 200/6 A |
| 5,490,239 | * 2/1996 | Myers | 345/429 |
| 5,528,259 | * 6/1996 | Bates et al. | 345/121 |
| 5,673,377 | * 9/1997 | Berkaloff | 345/430 |
| 5,694,153 | * 12/1997 | Aoyagi et al. | 345/161 |
| 5,818,420 | * 10/1998 | Mitsumine et al. | 345/156 |
| 5,854,622 | * 12/1998 | Brannon | 345/161 |
| 5,870,082 | * 2/1999 | Selker et al. | 345/168 |
| 5,886,684 | * 3/1999 | Miura et al. | 345/161 |

* cited by examiner

*Primary Examiner*—Vijay Shankar
(74) *Attorney, Agent, or Firm*—Robert Buckley; Marc D. McSwain; Ronald L. Drumheller

(57) ABSTRACT

A two-joystick interface for use with an information processing system having a 3D virtual reality module implements a bulldozer control metaphor permitting movement in three orthogonal directions—forward-backward, up-down, left-right—and turning about a vertical axis. The pointing interface includes mode switching permitting use of the joysticks for the cursor positioning and page scrolling functions of the information processing system. The pointing system includes a frame-of-reference conversion module for transforming the pointing devices software interface to a four-degree-of-freedom three-dimensional interface, an interface with a virtual reality module including a display function. Ergonomic embodiments of the interface include locating the joysticks, e.g., two IBM TrackPoints™ along the bottom row of keys of a standard keyboard, and, alternatively, placing the joysticks and related momentary switches in a wristpad.

36 Claims, 15 Drawing Sheets

INPUT FOR THREE DIMENSIONAL NAVIGATION USING TWO JOYSTICKS

BACKGROUND

1. Field of the Invention

The invention relates to information processing and multimedia systems, and in particular to a two-joystick, bulldozer-like interface for navigating in a virtual three-dimensional space.

2. Background of the Invention

Some Preliminary Definitions

FIG. 1 is a graph illustrating a 3D notation convention used in this patent application. The convention is designated generally by the numeral 10 and includes a left-right horizontal X axis 12, a vertical Y axis 14, a point-of-view Z axis 16, and rotation 18 about the Y axis is designated by the symbol $\Theta$. The X axis 12 is from the viewer's left side to the right side. The Y axis 14 is from the bottom toward the top, and the Z axis 16 is in the direction the viewer is facing. Pitch is rotation about the X axis, yaw is rotation about the Y axis, designated by the symbol $\Theta$, and roll is rotation about the Z axis.

Isometric devices have constant location and infinite resistance to displacement. Isotonic devices have constant resistance (e.g., zero) to displacement. Elastic devices have resistance force proportional to displacement.

We live in a three-dimensional (3D) world. Technological advances in computer graphics hardware, software and display systems will soon make real time 3D capabilities available to all mainstream computer systems. Furthermore, 3D technology is also beginning to be integrated into the Internet technology, making it possible for designers and users on various platforms to escape from the flatland of 2D HTML pages to share 3D information across the world. Virtual Reality Modeling Language (VRML), a language for modeling three-dimensional scenes and scripting animation on the World-Wide-Web (WWW), is an emerging standard for such a purpose. Using VRML, web designers can construct 3D "worlds" in which a remote user can navigate.

However, disorientation and difficulty of knowing how to move in current 3D interfaces are intolerably inhibiting the widespread applications of 3D technologies. Designing effective navigation interfaces is both a difficult challenge and an opportunity to the human factors community. First, it is a rare opportunity. As if we could move back in time to have the chance to design interfaces for aircraft and motor vehicles, we are now at the beginning of a new era when it is not (yet) too late. Furthermore, the "virtual navigation craft" does not impose on us any mechanic or dynamic constraint as in aircraft and motor vehicles. The only fundamental constraints to virtual 3D navigation interface lies in accommodating human capabilities and limitations. In other words, designing virtual world navigation interfaces is less like designing motor vehicles but more like searching for the "magic carpet" in the virtual world. A magic carpet takes us where we want to go without our having to worry about the mechanical details of getting there.

Although few fundamental constraints exist to designing virtual 3D navigation interfaces, there are many practical requirements for a navigation interface to gain rapid acceptance. Particularly, we have to consider the following:

integration with the existing GUI interfaces and tasks. Like any new interface technology, 3D navigation is in a bootstrap situation: not enough application and content may make it unjustified to have a special interaction device and lack of a usable interface and user population make developing 3D content less attractive. The solution lies in seamless integration of the 3D navigation devices with the existing GUI interfaces;

low cost, for the same reason as above; and both novice and expert "friendly". An acceptable navigation interface should be easy to learn in a few minutes while offering high performance to expert users.

Although there are many VRML browsers available today, the user interfaces of these browsers are very similar to each other. The basic interface design was set in Silicon Graphics' WebSpace™ (later known as CosmoPlayer™), the first commercially available VRML browser, which in turn was based on the 3D user interface work previous to VRML, see Zeleznik, R. C. et al., An Interactive 3D Toolkit For Constructing 3D Widgets, Proc. ACM SIGGRAPH '93, pp. 81–84, 1993.

With these existing browsers, 3D navigation is done by mapping 2 degrees of freedom (DOF) mouse cursor movements onto various translation and rotation degrees of freedom, according to the selected mode. For example, the WorldView™ browser, see WorldView™ VRML 2.0 Browser, Intervista Inc., at "http://www.intervista.com", has the following modes: walk (Z translation and Y rotation in rate control), pan (X and Y translation in rate control: FIG. 2), turn (X and Y rotation in rate control), roll (Z rotation in rate control), study (X and Y rotation of the world, instead of self, in position control) and goto (FIG. 3). A user can switch between these different mapping schemes by clicking on appropriate buttons. Some browsers also provide a restore mode to readjust the Y coordinate of the view coordinates with that of the world coordinates. Much effort had been spent on fine-tuning the mapping transfer functions in various modes.

When navigating in VRML worlds with the current browsers, users typically find themselves off their targets, facing upside-down, or lose their locations in the world. Multiple factors, such as low frame rate that delays the control feedback and sometimes badly designed "cueless" worlds themselves contribute to the "lost in virtual world" problem. One of the most critical factors lies in the mouse mapping navigation technique itself. Among the many drawbacks of this technique, the following are the most noticeable:

Mode switching. It is known that mode switching in user interface in general should be avoided.

Mode switching causes inconsistent response to the same input. For the same mouse movement, the results are different depending on the current mode. It is well known that when consistent mapping exists, human information processing behavior tends to become an "automatic process" which requires little central capacity, attention, or effort. In contrast, when consistent mapping is absent, human behavior tends to be a "controlled processes" which requires effort, attentional resource, and central capacity.

In many of these modes, cursor motions are mapped to movement "speed". The farther one moves the cursor from the initial click position, the faster the movement is. In other words, the cursor displacement is used for rate control, which is well suited for navigation where smooth and controllable speed is desirable. Experiments have shown that effective rate control requires self-centering mechanisms in devices such as isometric or elastic joysticks. Isotonic devices such as the mouse are poor in rate control tasks. Note that when one uses a rate controlled joystick (such as the TrackPoint™ by IBM) to move the cursor which is in turn mapped onto movement speed, the self-centering effect in the joystick is not utilized, since the self-centering variable (e.g., force) is not directly mapped onto the movement speed.

Visual information provided by the mouse pointer is counter-intuitive. Typically, when users want to approach an object in the world, they tend to bring the mouse pointer onto the object. However, due to the mapping function of the mouse (both speed and direction), such an action may cause unexpected results in which users tend to overshoot position and orientation.

Clearly a need exists for different devices and techniques to replace the status-quo interface. One apparent choice is the six degree-of-freedom hand controllers such as the "Spaceball" (see Zhai, S., Human Performance in Six Degree-of-Freedom Input Control, Ph.D. Thesis, University of Toronto, for a review of six degree-of-freedom devices, available at "http://vered.rose.toronto.edu/people/shumin_dir/publications.html").

Several reasons make this option difficult. First, these devices have been relatively expensive due to the small market size and they are not integrated with the general GUI interface (e.g., pointing), thus preventing a critical mass of user population to overcome the bootstrap problem. More importantly, these devices are designed primarily as "manipulation", not as "navigation" devices. Although both manipulation and navigation require multiple-degrees-of-freedom controllability, and they are mathematically equivalent problems, they may differ significantly in the human factors. When we manipulate objects, the multiple degrees of freedom tend to be integrated. On the other hand when we move (navigate) in the real world, we rarely use six degrees-of-freedom simultaneously. We primarily stay on a 2D surface, move in a given direction (X and Z translation) or turn around (Y rotation). We may move up and down (Y translation) when proper means are available. Pitch (X rotation) and roll (Z rotation) rarely happen to our body. The difficulties in learning to control a real six degree-of-freedom vehicle like a helicopter are legendary. Using an integrated six degree-of-freedom joystick for navigation in a virtual world can also be difficult to learn. One may spend much energy in finding one's orientation.

SUMMARY OF THE INVENTION

Based on these observations and the problems outlined above, we developed the bulldozer interface for VRML navigation.

The bulldozer interface is based on two TrackPoint™ isometric joysticks. There are currently two ergonomic embodiments to dual TrackPoint™ input. One is to integrate two TrackPoints™ into the keyboard control surface. Putting the TrackPoint™ below the C, V and M, N keys allows the TrackPoints™ to be touched with either forefinger and also to be out of the way of typing. The second embodiment is a wristpad instrumented with two TrackPoints™ (FIG. 2). Either of the two TrackPoints™ can be used as a pointing device and the other for scrolling.

While navigating in 3D worlds, the two TrackPoints™ are operated in an extended, flyable bulldozer metaphor. A total of four degrees of freedom were made available to the user (x, y, z translation and yaw). Pushing both TrackPoints™ forward the user moves forward in the 3D world. Pulling both TrackPoints™ moves the user backward. Pulling the left and pushing the right turns the user to the left and vice versa. Pushing both the TrackPoints™ horizontally in the same direction slides the user sideways. Pushing them in opposite directions moves the user up (outwards) and down (inwards).

Comparing against the criteria we outlined in the introduction, the bulldozer interface offers much promise:

Integration with existing GUI interfaces and applications. The bulldozer wristpad offers multiple functions. It is first a keyboard wristpad or keyboard itself, the TrackPoint™ and buttons are ergonomically designed to avoid accidental operation when a user rests her hands on it. Secondly, it offers the usual pointing function. Third, the TrackPoint™ on the non-dominant hand can be used for scrolling, eliminating the need of using the scroll bar. Studies have shown such a dual stream pointing and scrolling interface offers significant advantages in document (e.g. web) browsing tasks. Fourth, the dual TrackPoint™ can also be used for two-handed menu operation or two-handed graphical manipulation.

Low production costs due to the large quantity of TrackPoints™ produced for the Notebook computers A generic software solution has been developed that requires no change to the VRML browser.

The bulldozer interface offers higher navigation performance than the status quo.

The last point was a hypothesis based on the following analyses:

The bulldozer interface is modeless.

It works in rate control scheme that is well suited for navigation.

It offers more degrees of freedom, and the integration and separation of these degrees of freedom were designed according to the nature of human navigation.

It is based on an intuitive physical metaphor, not an artificial mapping of control motions. For all of the degrees of freedom, there is an isomorphic mapping between control and effect, except moving up and down.

BRIEF DESCRIPTION OF THE DRAWINGS

For a further understanding of the objects, features and advantages of the present invention, reference should be had to the following description of the preferred embodiment, taken in conjunction with the accompanying drawing, in which like parts are given like reference numerals and wherein.

DESCRIPTION OF THE PREFERRED EMBODIMENT

Figure 4:
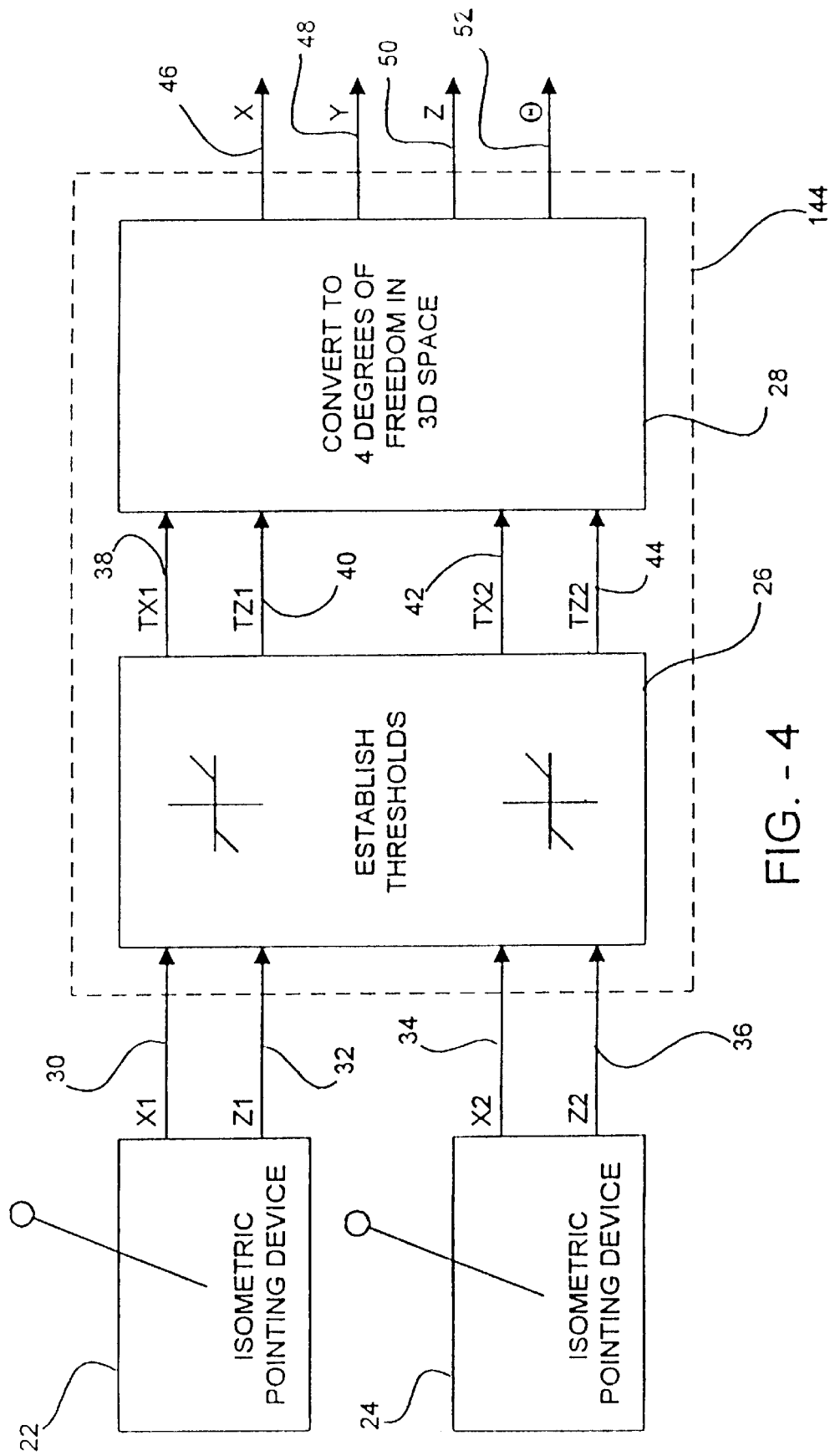
FIG. 4 is a schematic diagram showing one embodiment of the present invention.

With reference to FIG. 4, there is shown a schematic diagram which illustrates a specific embodiment of a three-dimensional pointing system for use with an information processing system (not shown). The pointing system is designated generally by the numeral 20 and includes a pair of pointing devices 22, 24, a threshold function 26, and a conversion function 28.

Each pointing device 22, 24 provides a pair of orthogonal output signals, X1 30, Z1 32, X2 34, and Z2 36, respectively. In this application reference to "signals" also includes other representations, e.g., digital representations. In a specific embodiment, the pointing devices 22, 24 include software drivers which are part of the information processing system. The output signal pairs (X1, Z1), (X2, Z2) each represent a displacement of the pointing device from a neutral position.

Experiments conducted with actual users teaches that navigation in a three-dimensional virtual reality is more readily learned and fewer mistakes are made when the pointing device output signal pairs 30–36 are treated as rates of change of position, rather than as absolute position.

In a specific embodiment of the invention, the pointing devices are isometric devices such as the finger-tip operated TrackPoint™ from IBM, Corp. In the case of the TrackPoint™, the output pairs of the device drivers are proportional to the pressure applied by a finger tip via a control lever. In another specific embodiment of the invention, the pointing devices are elastic joysticks. The device driver output pairs in the case of the joysticks are proportional to an absolute displacement from a neutral position.

In another specific embodiment of the invention, the device driver output pairs (X1, Z1), (X2, Z2) are applied directly (not shown) to the conversion function 28. In another specific embodiment, the device driver output pairs are applied to the threshold function 26, and the outputs of the threshold function TX1 38, TZ1 40, TX2 42, TZ2 44 are applied to the conversion function 28, as illustrated in FIG. 4.

The purpose of the threshold function 26 is to require inputs from the pointing devices to exceed some threshold, typically 30% to 50% of a maximum value, before producing a noticeable change at the output pairs (TX1, TZ1), (TX2, TZ2). This not only reduces the effects of input noise, but experiments with actual users has shown that it improves navigation in the three-dimensional virtual reality.

Figure 1:
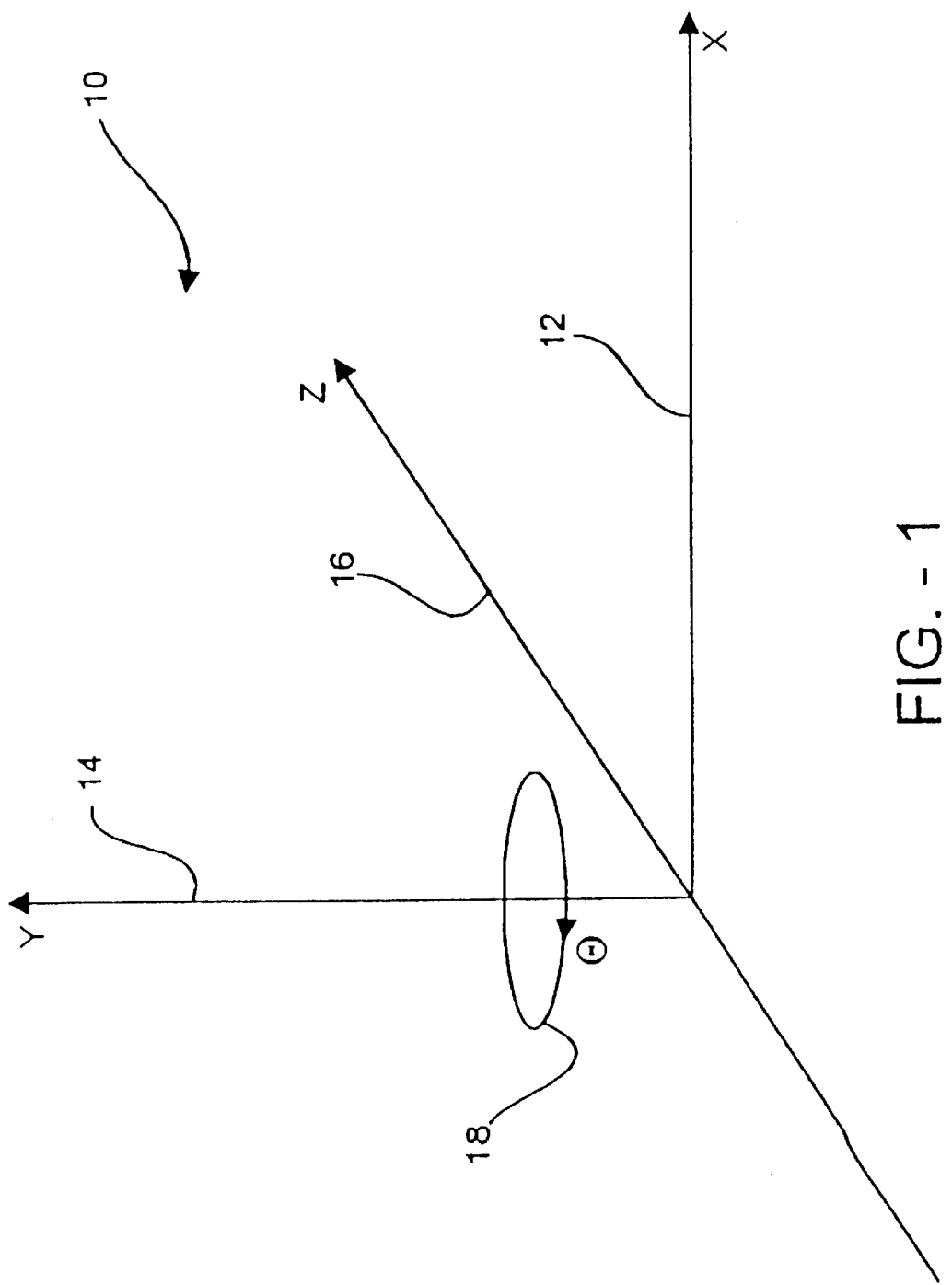
FIG. 1 is a graph illustrating a 3-D notation convention used in this application.

The conversion function 28 uses known linear transformations to convert the rate information received from the device drivers on lines 30–36 to translation along the three orthogonal axes X, Y and Z (FIG. 1) and turning about the Y axis, denoted by the symbol $\Theta$. In a specific embodiment, the conversion function 28 provides four output signals X 46, Y 48, Z 50, and $\Theta$ 52. In one specific embodiment, the signals (X, Y, Z, $\Theta$) represent rates of change rather than absolute linear and angular displacement. In another specific embodiment, the signals (X, Y, Z, $\Theta$) represent absolute linear and angular displacements. The signals (X, Y, Z, $\Theta$) define a three-dimensional space (FIG. 1).

Experiments with various virtual reality navigational methods have also taught that the two elastic joystick interface (also the two isometric pointing device interface) is easy to learn and use when the system implements a "tractor" or "bulldozer" metaphor.

FIGS. 5–10 are schematic diagrams which illustrate a specific bulldozer metaphor. In each of these diagrams two circles 54, 56 represent the two joysticks, while the arrows from each joystick represent a displacement away from a neutral position. The length of the joystick arrows is approximately proportional to the displacement of the joystick from the neutral position (proportional to the pressure applied to the lever of an isometric pointing device). The additional lines represent displacement along a specific axis, and rotation about one axis (FIG. 1).

Figure 5:
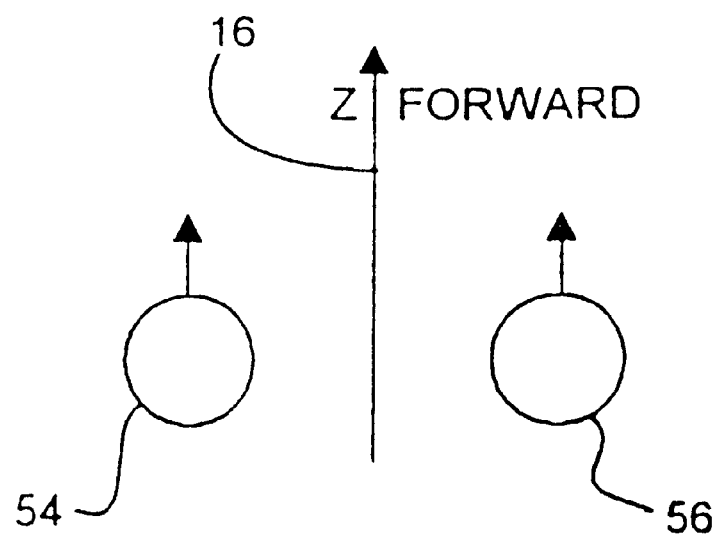
FIG. 5 is a schematic diagram which illustrates using two joysticks to command forward movement according to the present invention.

In FIG. 5, pushing forward on both sticks 54, 56 produces movement forward along a Z axis (16 FIG. 1), just as in controlling a bulldozer. The greater the forward displacement on both sticks 54, 56, the greater the velocity in the forward direction. Releasing the sticks (bringing them back to the neutral position) slows and then stops the forward motion.

Figure 6:
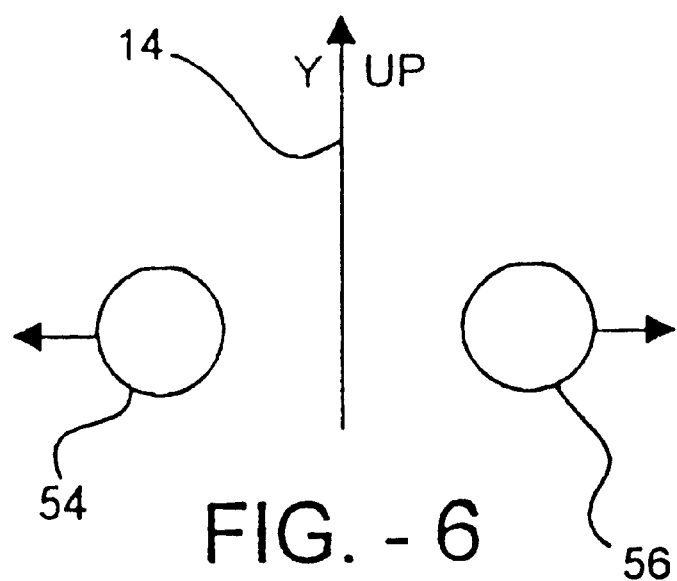
FIG. 6 is a schematic diagram which illustrates commanding upward movement.

In FIG. 6, pushing the two sticks 54, 56 away from each other, the left stick 54 pushed to the left, the right stick 56 pushed to the right, causes movement upward in a vertical direction along a Y axis (14 FIG. 1). The greater the displacement on both sticks away from each other, the greater the velocity in the upward direction. Releasing the sticks slows and then stops the upward motion.

Figure 7:
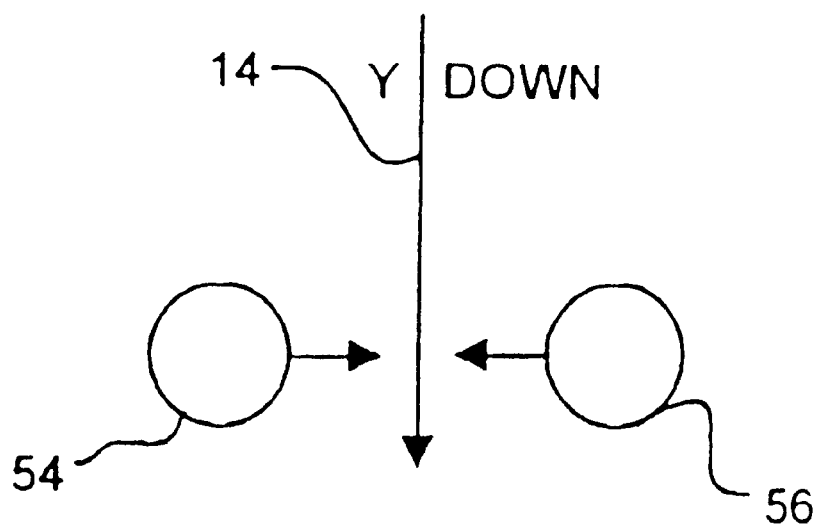
FIG. 7 is a schematic diagram which illustrates commanding downward movement.

In FIG. 7, pushing the two sticks 54, 56 toward each other, the left stick 54 pushed to the right, the right stick 56 pushed to the left, causes movement downward in a vertical direction along the Y axis (14 FIG. 1).

Figure 8:
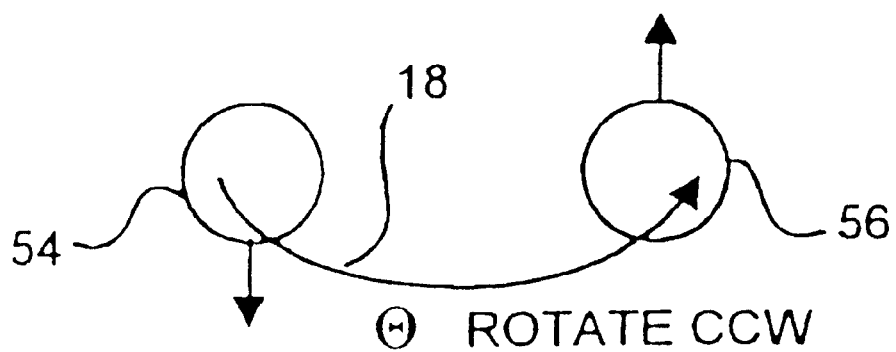
FIG. 8 is a schematic diagram which illustrates commanding a left turn.

In FIG. 8, pushing one stick forward and the other stick rearward results in turning ($\Theta$ 18 of FIG. 1) in the direction of the rearward stick, also just as in controlling a bulldozer. The rate of turning is proportional to the difference between the two stick displacements.

Figure 9:
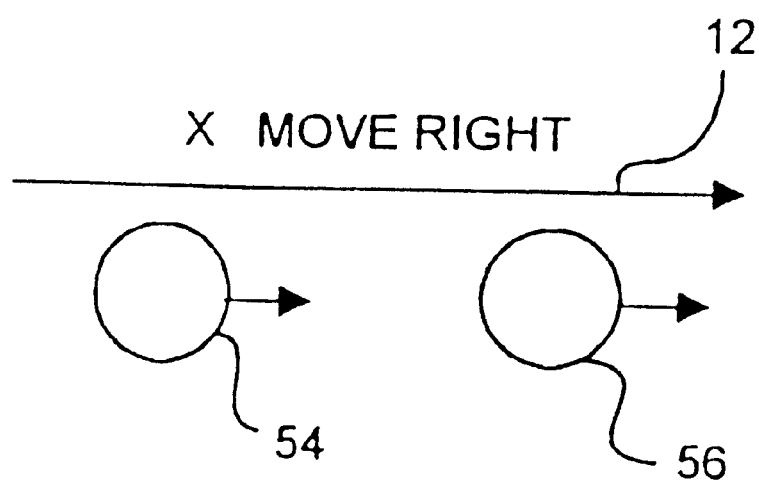
FIG. 9 is a schematic diagram which illustrates commanding a sideways movement to the right.

In FIG. 9, pushing both sticks 54, 56 to the same side produces movement to the side (unlike a bulldozer) in the direction of the sticks. The sideways speed is proportional to the sum of the two stick displacements. In FIG. 9, both sticks are pushed to the right side, producing movement to the right along an X axis (12 FIG. 1).

Figure 10:
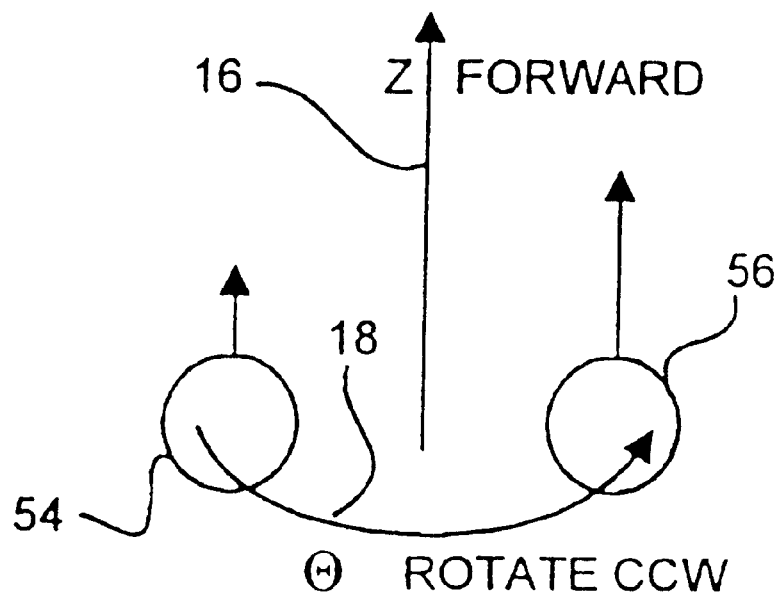
FIG. 10 is a schematic diagram which illustrates commanding a simultaneous forward movement and left turn.

Finally, in FIG. 10, a compound movement and turning are illustrated. The left stick 54 is pushed forward while the right stick 56 is also pushed forward but by a greater amount than the left stick (as indicated by the relative length of the arrows). This combination produces movement forward along the Z axis (16 FIG. 1) and turning (Θ 18 of FIG. 1) to the left in a counter clockwise direction about the Y axis. The speed in the forward direction is proportional to the sum of the stick displacements, while the turning rate is proportional to the difference between the stick displacements.

Figure 11:
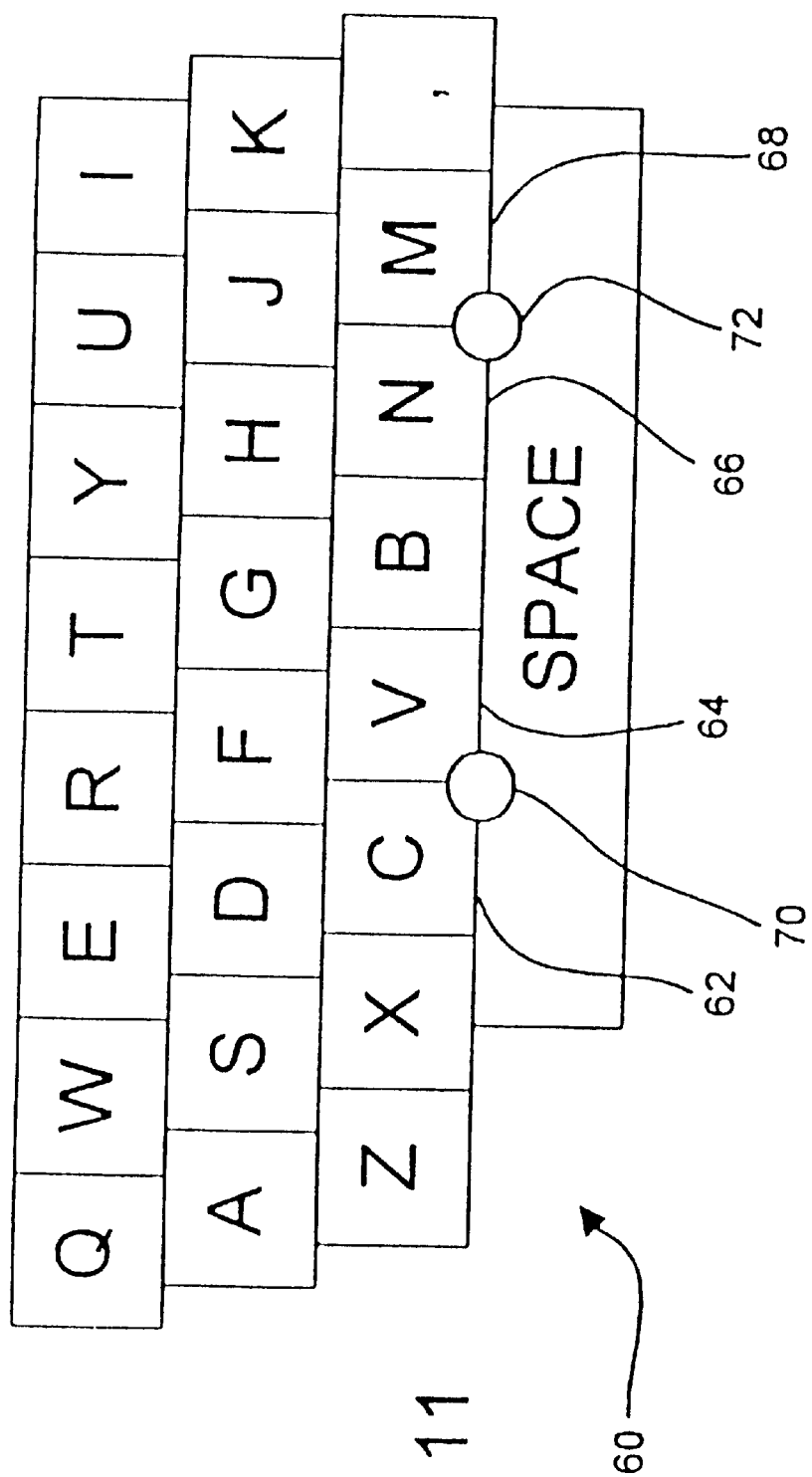
FIG. 11 is a plan view showing a portion of a keyboard having a pair of isometric pointing devices located below the bottom row of keys.

FIG. 11 is a partial plan view illustrating several keys of a typical keyboard including a pair of embedded isometric pointing devices, such as the IBM TrackPoint™. The illustrated keyboard portion is designated generally by the numeral 60, and includes the standard keys C 62, V 64, N 66, and M 68. The keyboard also includes a left pointing device 70 and a right pointing device 72. The left pointing device is shown located below and halfway between the C and the V keys. The right pointing device is shown located below and halfway between the N and the M keys. This position for the two pointing devices defines one specific embodiment of the invention and provides for convenient manipulation of the pointing devices by fingers and thumbs of opposite hands.

Figure 12:
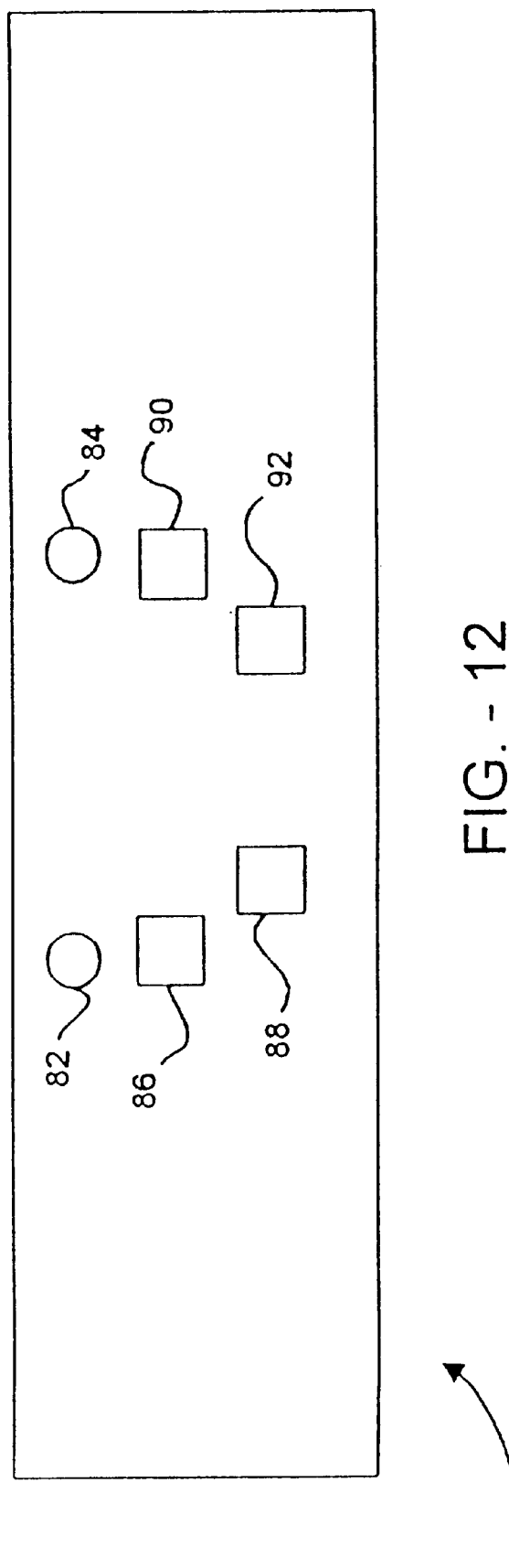
FIG. 12 is a plan view showing a keyboard wristpad including a pair of isometric pointing devices and four manually operated momentary switches.

In another specific embodiment of the invention, the pointing devices and several manually operated momentary switches are located for convenient manipulation in a wrist pad which is located below the keyboard. This embodiment is illustrated in FIG. 12, a plan view of a wrist pad, designated generally by the numeral 80. The wrist pad 80 includes a left pointing device 82, a right pointing device 84, and momentary switches 86, 88, 90 and 92. Again, the pointing devices 82, 84 and the switches 86–92 are located for convenient manipulation by the fingers and thumbs of both hands.

Figure 13:
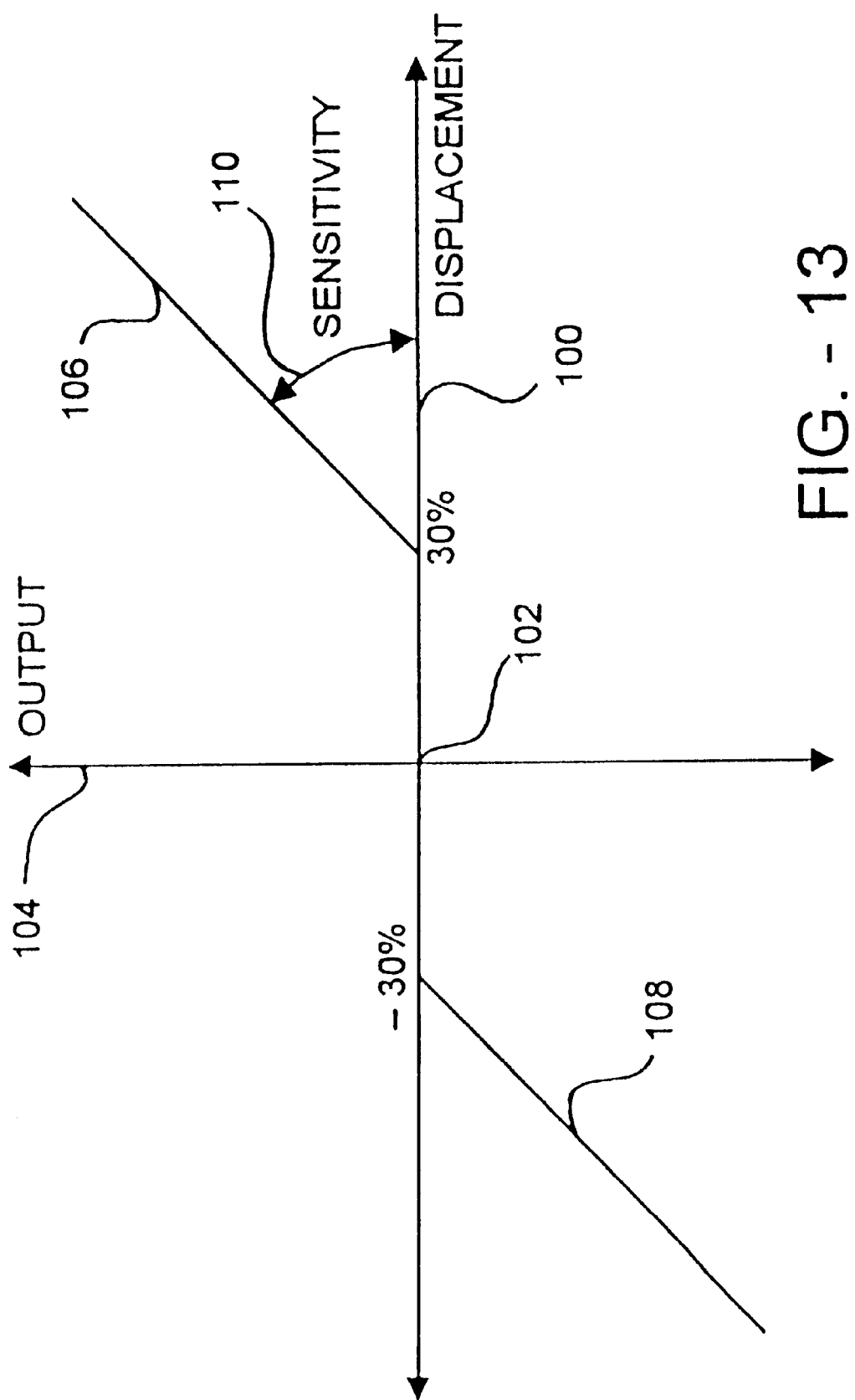
FIG. 13 is a graph which illustrates an input threshold and sensitivity relation according to several aspects of the invention.

FIG. 13 is a graph which illustrates the operation of the threshold function 26 of FIG. 4. Displacement of a pointing device away from its neutral position is indicated by a displacement along a horizontal axis 100 of FIG. 13. The greater the displacement of the pointing device in one direction, the greater the displacement from the center 102 along the horizontal axis 100. Displacement of the pointing device in an opposite direction corresponds to a displacement in the opposite direction from the center 102 along the axis 100. The vertical axis 104 corresponds to a pointing device driver output signal, e.g., X1 30 of FIG. 4. The function represented by the graph of FIG. 13 illustrates that when a pointing device is displaced from the neutral position by less than a threshold amount (±30% in FIG. 13), the output is zero. It is only when the displacement of the pointing device, as indicated by displacement along the horizontal axis 100 of FIG. 13, exceeds the threshold in either direction that a non-zero output is produced. Such a non-zero output is indicated by the sloping lines 106, 108. So long as the displacement is less than ±30% of a maximum possible displacement, the output is zero.

The angle that the sloping lines 106, 108 make with the horizontal axis 100 corresponds to a sensitivity 110 of the output, e.g., X1 30 of FIG. 4, with respect to a displacement which exceeds the threshold ±30%. In a specific embodiment the sensitivity of each pointing device driver signal (X1, Z1), (X2, Z2) is adjustable.

Experiment has shown that an optimum sensitivity is associated with each type of movement in a three-dimensional virtual reality space. Typically the optimum sensitivity is greatest in the Z direction (16 of FIG. 1), less in X and Y directions (12, 14 of FIG. 1) and least in the turning movements (Θ 18 of FIG. 1). Experiment has also shown that a threshold of approximately ±30% is optimum for translation movements in the X, Y and Z directions, and that a threshold of approximately ±50% is optimum for turning movements Θ.

Figure 14:
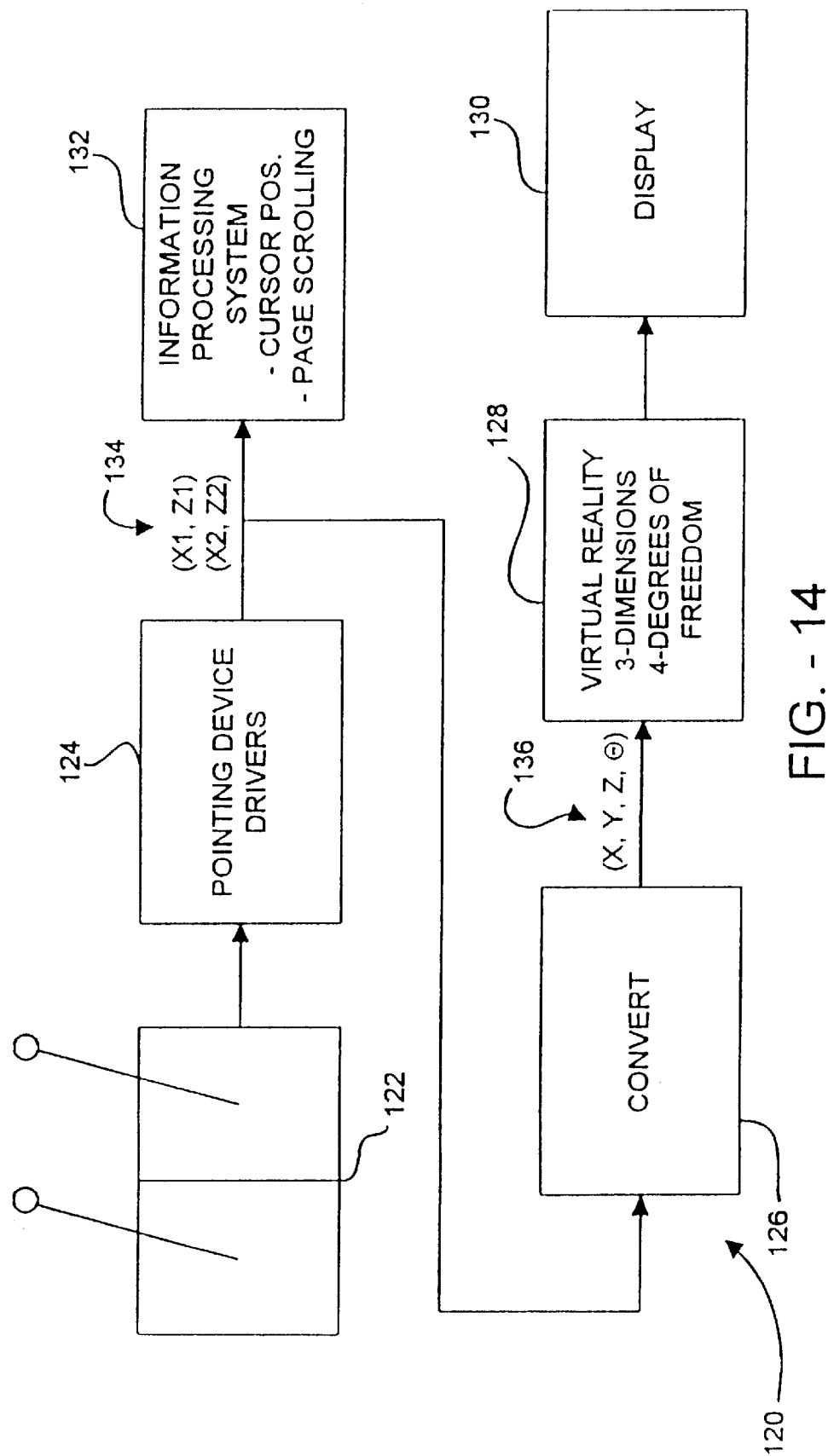
FIG. 14 is a schematic diagram which illustrates another embodiment of the invention.

FIG. 14 is a schematic diagram represents another embodiment which illustrates additional aspects of the present invention. FIG. 14 illustrates a multi-purpose pointing system for use with an information processing system, including a three-dimensional virtual reality component. The embodiment is designated generally by the numeral 120, and includes a pair of pointing devices, both designated by the single numeral 122, pointing device drivers 124, a conversion function 126, a virtual reality component 128, and a display 130. Also shown is the information processing system 132, of which the other elements of the embodiment are a part.

Output signal pairs (X1, Z1), (X2, Z2) 134 from the pointing device drivers 124 are converted by the conversion function 126 to the signals (X, Y, Z, Θ) 136 as previously described.

The pointing devices 122 are used for maneuvering in a three-dimensional virtual reality space created by the virtual reality component 128 and displayed on the display 130. In a specific embodiment, the pointing device drivers 124 are implemented as software components and provide a software interface between the information processing system 132 and the pointing devices 122. The conversion function 126 is responsive to the software drivers for transforming the pointing devices software interface to a four-degree-of-freedom three-dimensional interface. Finally, the virtual reality component is responsive to the four-degree-of-freedom interface for defining and maneuvering a point-of-view in a three-dimensional virtual reality displayed on the display 130.

The phrase "point-of-view" means a three-dimensional representation as seen by a viewer in which the Z axis (16 FIG. 1) represents the direction in which the viewer is facing, the Y axis (14 FIG. 1) represents a viewer vertical axis and the X axis (12 FIG. 1) represents a viewer horizontal axis. Turning from the point-of-view of the viewer is limited in a specific embodiment to rotation (Θ 18 FIG. 1) about the viewer vertical axis.

In a specific embodiment the pointing devices are isometric devices such as the IBM TrackPoint™ devices illustrated in FIGS. 11 and 12. In another specific embodiment, the pointing devices are the elastic joysticks described above. In a specific embodiment, the device driver outputs 134 and the conversion function outputs 136 represent speed of movement and turning rather than absolute translation and rotation.

In another specific embodiment, the pointing devices drivers provide a compatible software interface 134 between the information processing system 132 and the pointing devices 122. In this mode of operation, one pointing device is used for standard cursor positioning and selecting and activation, while the other pointing device is used for scrolling a displayed document without the need to use a scroll bar.

FIGS. 15, 16, 17 and 18 are schematic diagrams which illustrate various specific embodiments of the conversion function 126 of FIG. 14 (indicated in FIGS. 15–18 by the broken line 126). As in FIG. 14, the inputs to the conversion function 126 are the device driver outputs (X1, Z1), (X2, Z2) 134, and the output of the conversion function 126 are the signals (Y, Y, Z, Θ) 136. Both the input signals 134 and the output signals 136 represent rates of change, as described above.

Figure 15:
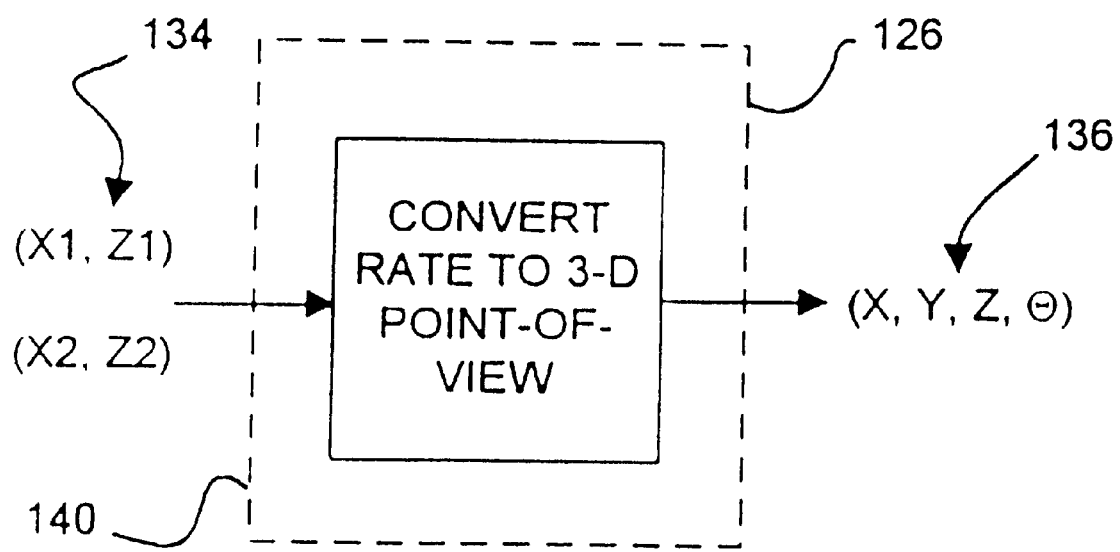
FIG. 15 is a schematic diagram which illustrates a conversion between two pointer inputs and a 4-degree of freedom in a 3-D space output.

In FIG. 15 the conversion function 126 includes only a function 140 for converting the inputs 134 to the outputs 136, as previously described with respect to FIG. 4. The function 140 of FIG. 15 corresponds to the conversion function 28 of FIG. 4.

Figure 16:
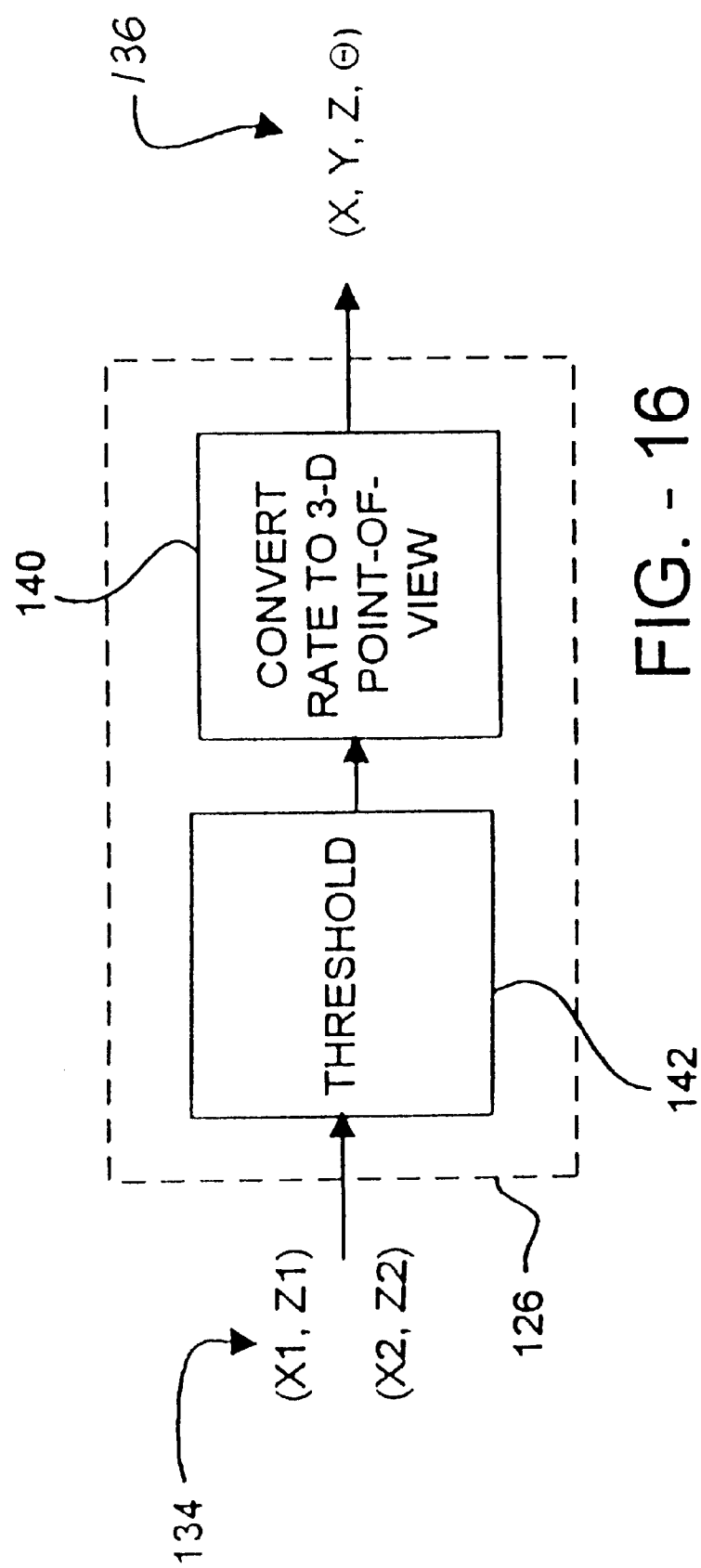
FIG. 16 is a schematic diagram which illustrates the conversion of FIG. 15 preceded by a threshold function.
Figure 17:
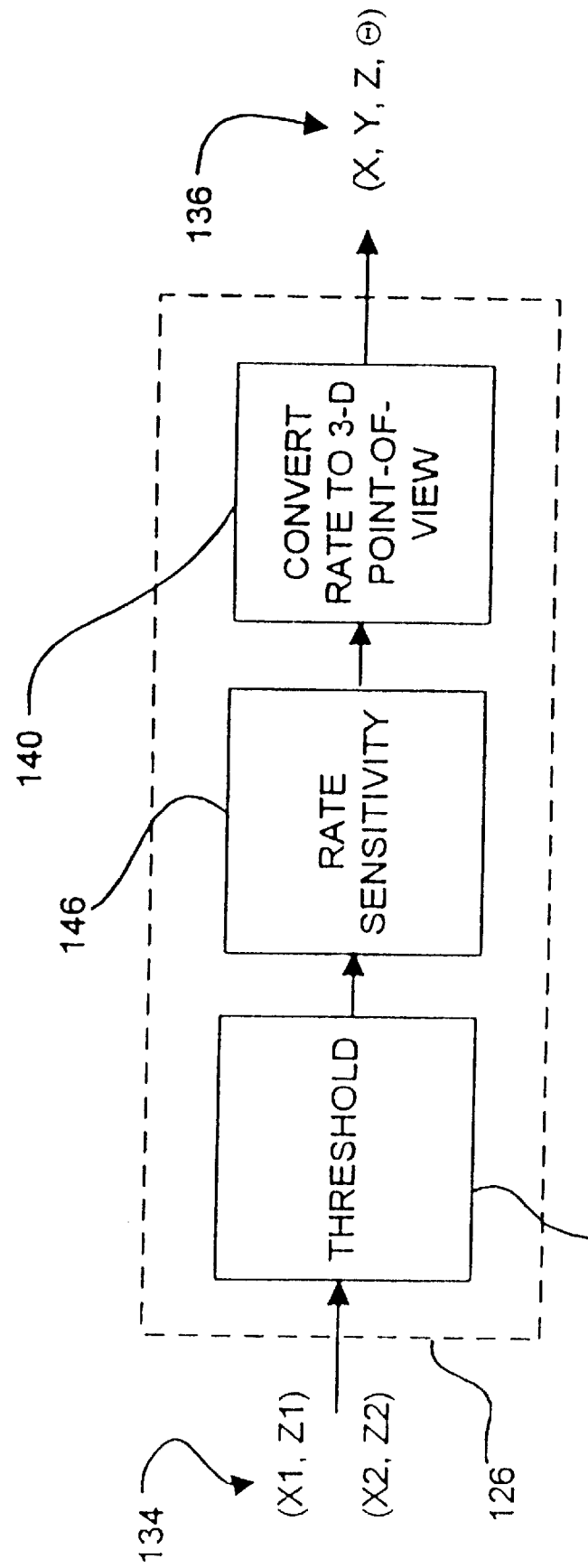
FIG. 17 is a schematic diagram which illustrates the conversion and threshold functions of FIG. 16 and a rate sensitive function.

In FIG. 16 the conversion function 126 includes a threshold function 142 which performs the functions described with respect to FIG. 13 and the element 26 of FIG. 4. For FIG. 16 the conversion function 126 is equivalent to the combined functions 26 and 28 of FIG. 4 (shown enclosed by the broken line 144 of FIG. 4).

In FIG. 16 the conversion function 126 includes a sensitivity function 146 as described above with respect to FIG. 13.

Figure 18:
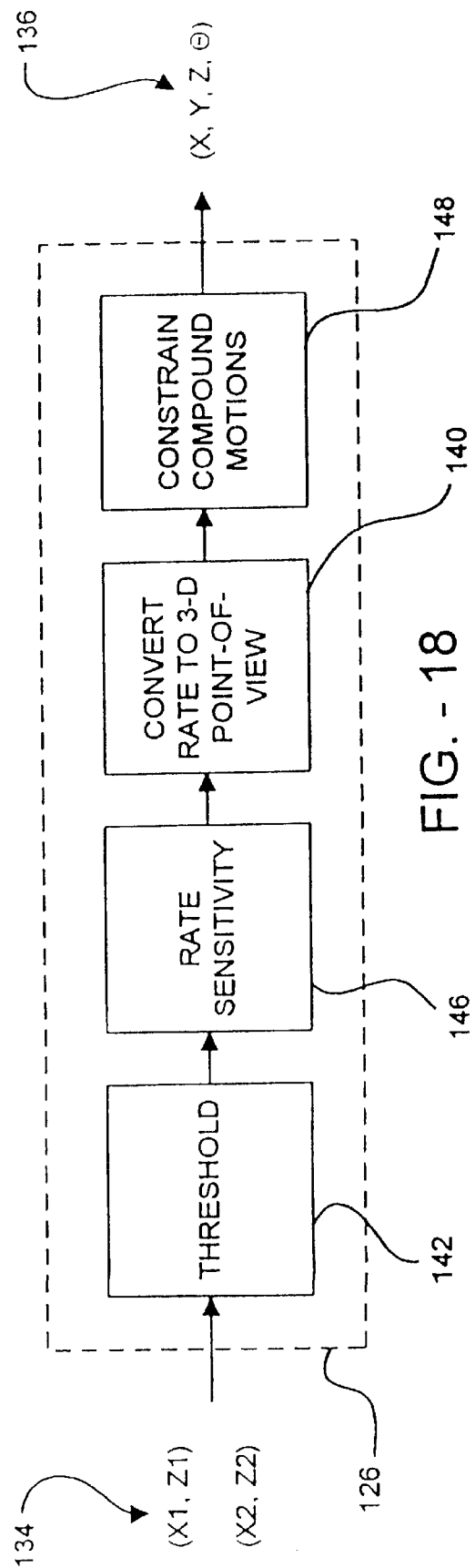
FIG. 18 is a schematic diagram which adds a compound motion constraint function to the functions of FIG. 17.

In FIG. 18 the conversion function 126 includes a function 148 used to constrain specific compound movements within a virtual three-dimensional space. The constraint function 148 is necessary because the bulldozer metaphor described above with respect to FIGS. 5–10 permits various degrees of freedom of motion and turning to be combined without limit. Yet, experiments have shown that many users quickly become disoriented while navigating a virtual reality three-dimensional space when all possible combinations are permitted. In a specific embodiment, the function 148 will disregard any commanded motion and turning which exceeds the input thresholds (FIG. 13) except for the combination movement to the side while turning. This particular combination has been found useful because it permits the user to circle about an object in virtual space while coordinating a turn for keeping the object in view directly ahead.

In a specific embodiment, the function 148 is programmable to permit and to inhibit predetermined combinations of movement and turning.

Another specific embodiment of the invention defines a method for navigating with four degrees of freedom in a three-dimensional virtual reality. The method includes the steps of providing a pair of joystick pointing devices and compatible device drivers each providing a pair of orthogonal outputs (e.g., 122 of FIG. 4). The method continues with a steps of transforming the device driver outputs to a three-dimensional, four-degree-of-freedom set of transformed outputs, and providing the transformed outputs for navigating within a three-dimensional virtual reality system. Additional embodiments of the method provide steps for creating thresholding and sensitivity functions as described with respect to FIG. 13, and a compound motion constraint function as described with respect to FIG. 18.

Figure 2:
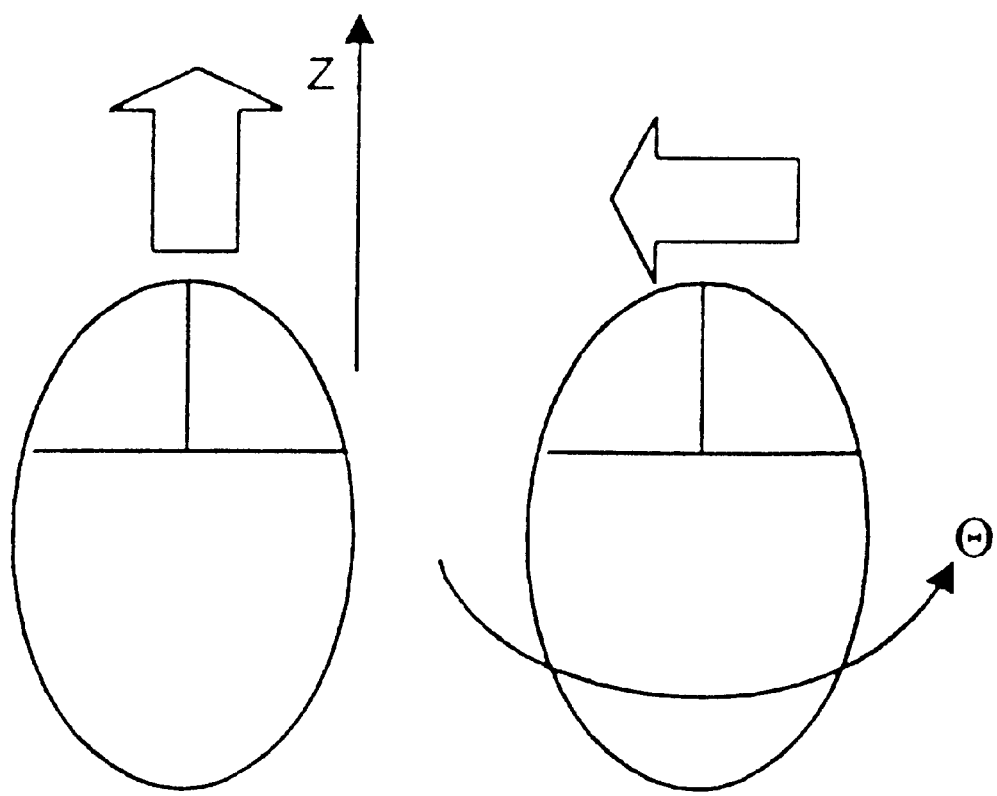
FIG. 2 is a schematic diagram illustrating one aspect of a prior art 3-D navigating method.
Figure 3:
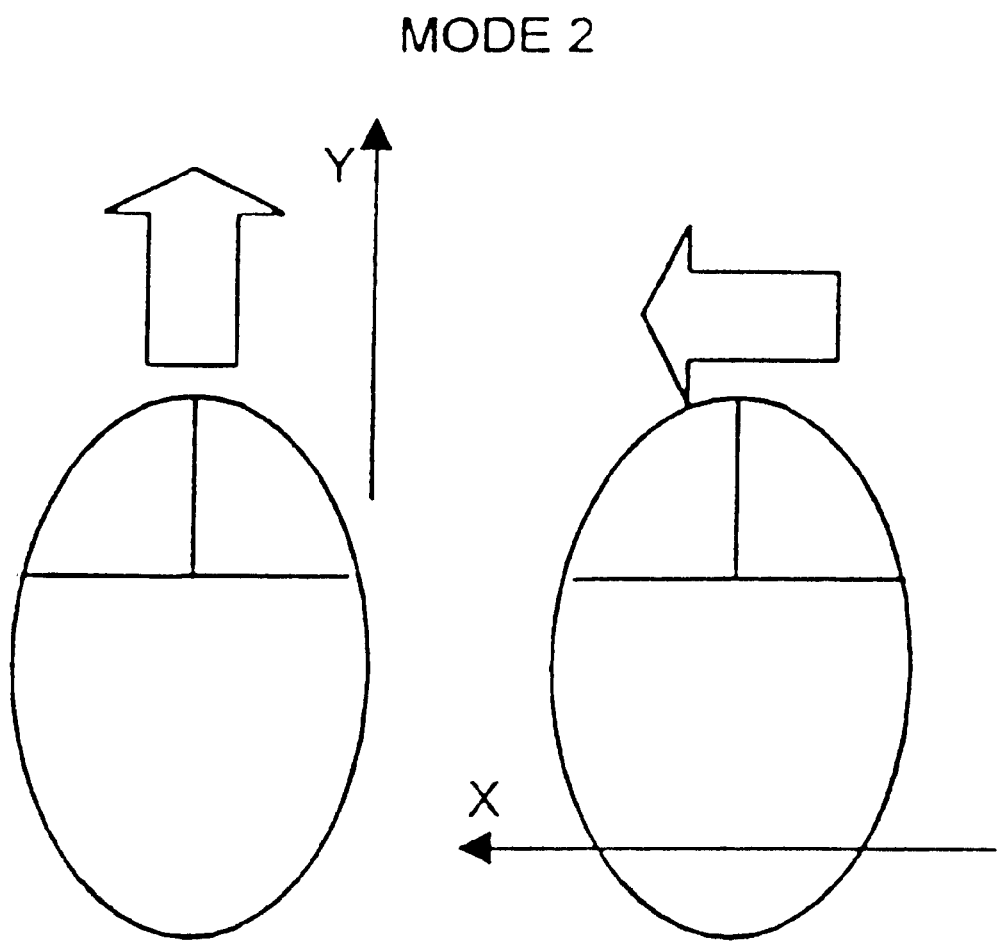
FIG. 3 is a schematic diagram illustrating another aspect of a prior art 3-D navigating method.

The bulldozer interface was experimentally tested against the status-quo mouse-mapping navigation interface (FIGS. 2, 3). The purpose of the experiment was to estimate user performance and preference of a bulldozer interface. The experimental tasks were chosen to represent typical maneuvers in 3D navigation. A total of 12 subjects participated in the experiment. All twelve subjects were regular users of the mouse. Eight of them used the TrackPoint™ regularly, three subjects had little experience and one had no previous experience with the TrackPoint™. Each subject was tested on both the bulldozer and the mouse interface.

The experiment results showed that the bulldozer interface provided a clear and substantial amount of advantage over the status quo mouse-mapping interface, both in terms of navigation performance and in terms of user's preference. Although all of the subjects had more experience with mouse, their mean navigation performance was faster with the bulldozer interface in all conditions.

The bulldozer interface made four degrees of freedom available to the user without requiring explicit mode switching. However, as discussed earlier, some degrees of freedom should be integrated (simultaneously activating) and others should be separated (de-coupled) by means of mutual prohibition or thresholding. For instance, pilot tests showed that it was preferable to have forward movements (Z translation) and turns (Y rotation) separated so that it is easier to move straight ahead. On the other hand, we allowed simultaneous side translation and rotation. We observed that subjects quickly made use of such a capability and performed circular movement facing the center of the circle by simultaneously moving sideways (X translation) and turning (Y rotation). This style of navigation proved to be very useful in free flying tasks in which the users could move themselves while keeping a target object in view.

While the invention has been described in relation to the embodiments shown in the accompanying Drawing figures, other embodiments, alternatives and modifications will be apparent to those skilled in the art. It is intended that the Specification be only exemplary, and that the true scope and spirit of the invention be indicated by the following claims.

What is claimed is:

1. A three-dimensional pointing system for use with an information processing system, comprising:
    a first computer pointing device for receiving first manual input commands with two degrees of freedom from an operator and for generating first output signals corresponding to the two degrees of freedom;
    a second computer pointing device for receiving second manual input commands with the same two degrees of freedom from the same operator and for generating second output signals corresponding to the two degrees of freedom;
    converting means for receiving the first and second output signals and for converting the first and second output signals into a single set of command signals having four degrees of freedom and representing navigation along three orthogonal axes of a three-dimensional space and rotation about one of the three axes.

2. The pointing system as set forth in claim 1, wherein the pointing devices are isometric devices.

3. The pointing system as set forth in claim 2, wherein the pointing devices are TrackPoint™ devices.

4. The pointing system as set forth in claim 1, wherein the pointing devices are elastic joysticks.

5. The pointing system as set forth in claim 1, wherein the pointing devices are incorporated into a keyboard.

6. The pointing system as set forth in claim 5, wherein the first pointing device is located below the C and the V keys of the keyboard, and the second pointing device is located below the N and the M keys.

7. The pointing system as set forth in claim 1, further including a wristpad having the first and second pointing devices located thereon.

8. The pointing system as set forth in claim 7, wherein the wristpad also includes at least one manually operated momentary switch defining a push button, the at least one push button providing an output signal.

9. The pointing system as set forth in claim 1, wherein the converting means includes threshold means connected for receiving the pointing device output signals and for providing an independently transformed signal for each pointing device output signal such that the transformed signal is proportional to the received signal which exceeds a predetermined bi-directional threshold, the transformed signals thereafter being converted to the set of command signals having four degrees of freedom.

10. The pointing system as set forth in claim 9, wherein the converting means also includes means for setting a predetermined level of sensitivity of each degree of freedom to the pointing device output signals.

11. The pointing system as set forth in claim 10, wherein the converting means includes compound motion constraint means for permitting and for disabling combined movements and rotation in predetermined degrees of freedom.

12. The pointing system as set forth in claim 1, further including display means for creating and displaying a three-dimensional virtual reality, the set of command signals having four degrees of freedom corresponding to the virtual reality.

13. The pointing system as set forth in claim 12, wherein the command signals of the converting means define a point-of-view in the displayed virtual reality.

14. The pointing system as set forth in claim 12, wherein the command signals correspond to left-right, forward-backward, up-down, and rotation clockwise and counter clockwise about an up-down axis.

15. The pointing system as set forth in claim 14, wherein moving both pointing devices in a forward direction causes a forward motion in the virtual reality, moving both pointing devices in a backward direction causes a backward motion in the virtual reality, moving both pointing devices to a left side causes a translation movement toward the left side in the virtual reality, moving both pointing devices to a right side causes a translation movement toward the right side in the virtual reality, moving both pointing devices sideways toward each other causes movement downward in the virtual reality, moving both pointing devices sideways away from each other causes movement upward in the virtual reality, moving a left pointing device forward and a right pointing device backward causes a clockwise rotation in the virtual reality, and moving a left pointing device backward and a right pointing device forward causes a counter clockwise rotation in the virtual reality.

16. The pointing system as set forth in claim 1 wherein the first and second pointing devices are joysticks which provide a bulldozer-like steering interface for navigating in a virtual three-dimensional space.

17. The pointing system as set forth in claim 1 wherein the first pointing device is a joystick for an operator's left hand and the second pointing device is a joystick for an operator's right hand, the two joysticks being manipulated at the same time by an operator and together controlling a single navigation path and orientation within a virtual three-dimensional space.

18. A multi-purpose pointing system for use with an information processing system that includes three-dimensional virtual reality software, the pointing system comprising:
  first and second pointing devices for receiving respective first and second two-dimensional manual input commands from an operator, each of the pointing devices having a same two degrees of freedom;
  software drivers for providing respective two-dimensional pointing device interfaces between the information processing system and the first and second pointing devices;
  means responsive to the software drivers for transforming the two-dimensional pointing device interfaces into a single four-degree-of-freedom three-dimensional interface;
  the virtual reality software being responsive to the four-degree-of-freedom interface for maneuvering a point-of-view in the three-dimensional virtual reality; and
  display means for displaying the three-dimensional virtual reality.

19. The multi-purpose pointing system as set forth in claim 18, wherein the pointing devices are isometric.

20. The multi-purpose pointing system as set forth in claim 19, wherein the pointing devices are TrackPoints™.

21. The multi-purpose pointing system as set forth in claim 18, wherein the pointing devices are elastic joysticks.

22. The multi-purpose pointing system as set forth in claim 18, wherein the pointing devices are incorporated into a keyboard.

23. The multi-purpose pointing system as set forth in claim 22, wherein the first pointing device is located below the C and the V keys of the keyboard, and the second pointing device is located below the N and the M keys.

24. The multi-purpose pointing system as set forth in claim 18, further including a wristpad having the first and second pointing devices located thereon.

25. The multi-purpose pointing system as set forth in claim 24, wherein the wristpad also includes at least one manually operated momentary switch defining a push button, the at least one momentary switch providing an output signal, and at least one software driver being responsive to the switch.

26. The multi-purpose pointing system as set forth in claim 18, wherein each output of the device drivers represents a rate of translation along an axis.

27. The multi-purpose pointing system as set forth in claim 18, further including a threshold function for providing an output proportional to the magnitude of the output signal of a device driver which exceeds a predetermined, bi-directional threshold, and for providing a zero output when the magnitude of the output signal is less than the threshold.

28. The multi-purpose pointing system as set forth in claim 27, further including a sensitivity function for setting a value for a ratio of a sensitivity function output signal to the output signal of a device driver.

29. The multi-purpose pointing system as set forth in claim 28, further including compound motion constraint means for enabling and for disabling predetermined combinations of movement and turning.

30. The multi-purpose pointing system as set forth in claim 18, further including cursor positioning means and page scrolling means responsive to the two-dimensional pointing device interfaces for positioning an information processing system cursor and for scrolling information processing pages respectively, and wherein the pointing devices are alternatively used for maneuvering in the virtual reality and positioning and scrolling.

31. A method for navigating with four degrees of freedom in a three-dimensional virtual reality, comprising the steps of:
  providing a pair of joystick pointing devices and compatible device drivers each providing a pair of orthogonal outputs;
  transforming the device driver outputs to a single three-dimensional, four-degree-of-freedom set of transformed outputs; and
  using the set of transformed outputs for navigating within a three-dimensional virtual reality system.

32. The method as set forth in claim 31, including the step of defining a bi-directional threshold for each device driver output wherein an output of zero is provided to the transforming step if the driver output is less than the defined threshold, and an output proportional to the driver output is provided otherwise.

33. The method as set forth in claim 32, including the step of defining a predetermined gain for each threshold step output provided to the transforming step, and applying the predetermined gain to the threshold step output before providing the amplified output to the transforming step.

34. The method as set forth in claim 33, including the step of defining combinations of movement and turning, and for enabling and disabling predetermined combinations of movement and turning.

35. The method as set forth in claim 34, wherein the combination of side movement and turning is enabled.

36. The method as set forth in claim 31, wherein the outputs of the transforming step define a viewer point-of-view orientation within the three-dimensional virtual reality system.

* * * * *